United States Patent
Osawa

(10) Patent No.: US 9,062,967 B2
(45) Date of Patent: Jun. 23, 2015

(54) MEASUREMENT APPARATUS FOR MEASURING A SURFACE SHAPE OF AN OBJECT BASED ON AN INTERFERENCE SIGNAL

(71) Applicant: CANON KABUSHIKI KAISHA, Tokyo (JP)

(72) Inventor: Hiroshi Osawa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 202 days.

(21) Appl. No.: 13/775,828

(22) Filed: Feb. 25, 2013

(65) Prior Publication Data

US 2013/0235386 A1   Sep. 12, 2013

(30) Foreign Application Priority Data

Mar. 9, 2012   (JP) ................................. 2012-053686
Jul. 25, 2012   (JP) ................................. 2012-165139

(51) Int. Cl.
*G01B 11/02*   (2006.01)
*G01B 11/24*   (2006.01)

(52) U.S. Cl.
CPC ................................. *G01B 11/2441* (2013.01)

(58) Field of Classification Search
CPC ........... G01B 9/02007; G01B 9/02017; G01B 9/02018; G01B 9/02019; G01B 9/02027; G01B 9/02062; G01B 9/02063; G01B 11/2441; G01B 2290/70
USPC .......... 356/485, 486, 487, 489, 496, 498, 511
See application file for complete search history.

(56) References Cited

U.S. PATENT DOCUMENTS

| 4,353,650 | A |   | 10/1982 | Sommargren |
| 5,122,648 | A | * | 6/1992 | Cohen et al. ................ 250/201.3 |
| 5,784,164 | A | * | 7/1998 | Deck et al. .................... 356/511 |
| 7,492,468 | B2 | * | 2/2009 | Henselmans et al. ......... 356/511 |
| 2005/0280830 | A1 | * | 12/2005 | Rembe .......................... 356/511 |

FOREIGN PATENT DOCUMENTS

JP   2009-145095 A   7/2009

OTHER PUBLICATIONS

Mechanoptics, 1981 Survey, Optical Technology Association, Jul. 1982.

* cited by examiner

*Primary Examiner* — Michael A Lyons
(74) *Attorney, Agent, or Firm* — Rossi, Kimms & McDowell LLP

(57) ABSTRACT

The present invention provides a measurement apparatus which measures a measurement surface based on an interference signal obtained by causing measurement light reflected by the measurement surface and reference light reflected by a reference surface to interfere with each other, the apparatus including an interference optical system including a lens for focusing the measurement light to be incident on the measurement surface, and configured to cause the measurement light and the reference light to interfere with each other, and an adjusting device configured to adjust a focusing state of the measurement light focused by the lens such that a measurement point on the measurement surface positions within a range of a depth of focus of the lens, wherein the interference signal is obtained with the focusing state adjusted by the adjusting device.

16 Claims, 10 Drawing Sheets

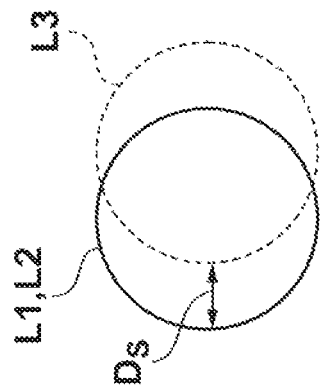
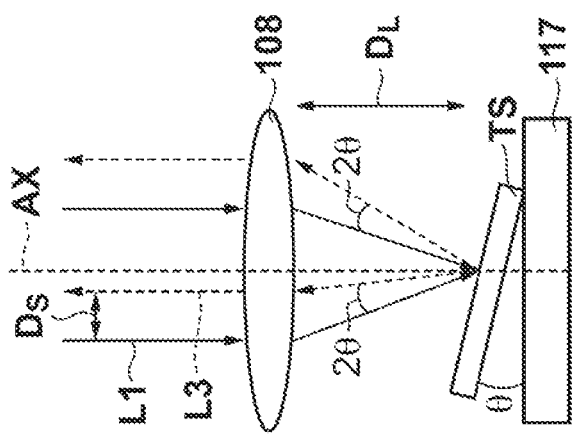
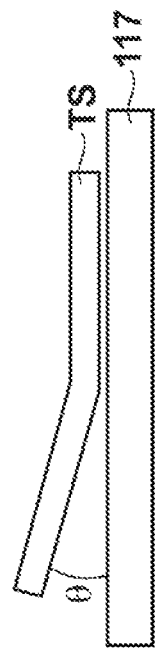
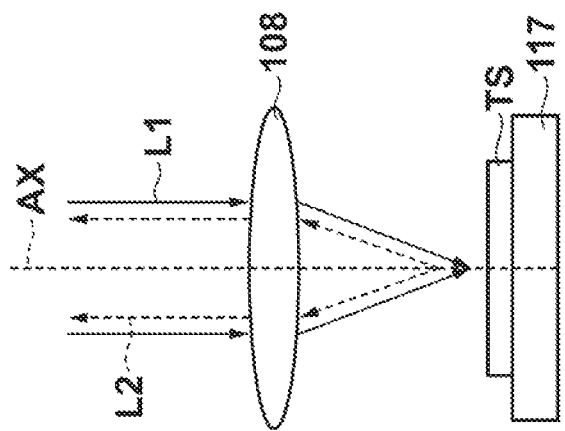

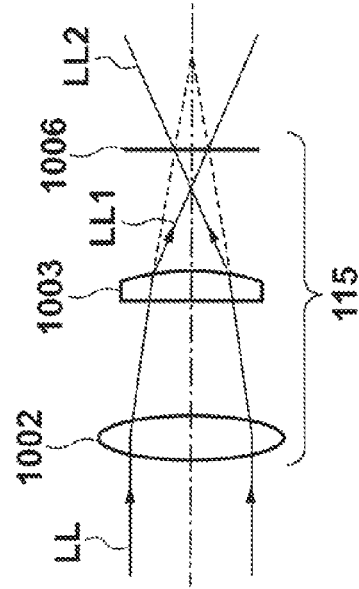
F I G. 10A
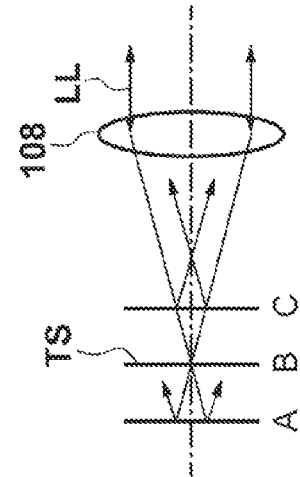
F I G. 10B
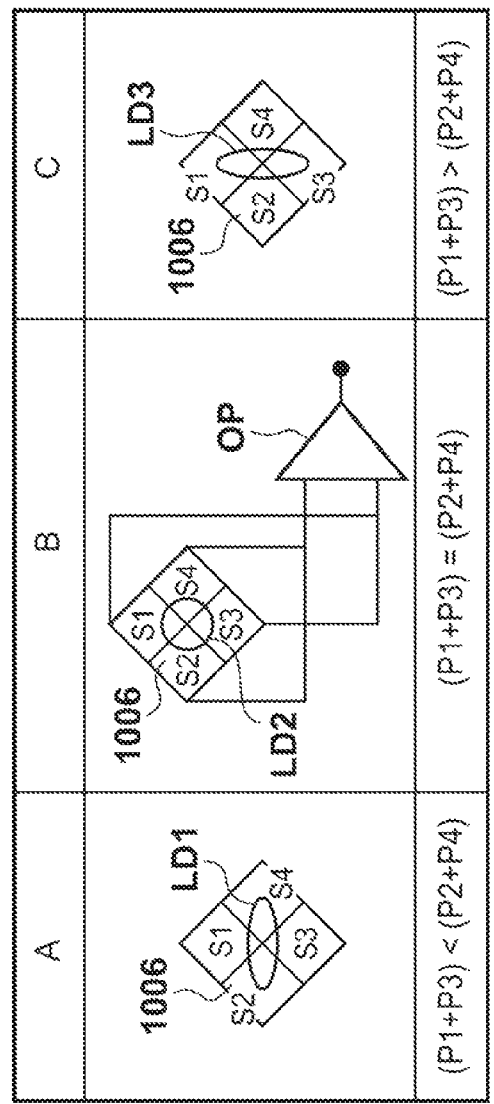
F I G. 10C

MEASUREMENT APPARATUS FOR MEASURING A SURFACE SHAPE OF AN OBJECT BASED ON AN INTERFERENCE SIGNAL

BACKGROUND OF THE INVENTION

1. Field of the Invention

The present invention relates to a measurement apparatus which measures a surface.

2. Description of the Related Art

The dimensions of the primary mirror of a telescope installed on the ground for astronomic observation are becoming larger to improve the performance of the telescope. For example, in the Subaru Telescope, a primary mirror formed from one mirror has a dimension of 8.2 m.

Recently, there has been proposed a telescope using, as a primary mirror, a composite mirror configured by connecting a plurality of hexagonal mirrors (segment mirrors). For example, the primary mirror of the TMT (Thirty Meter Telescope) tries to implement an effective aperture of 30 m by using a composite mirror formed from 492 segment mirrors (hexagonal mirrors each having a circumscribed circle diameter of 1.5 m and a diagonal line length of 1.44 m).

To manufacture a segment mirror forming such a composite mirror at high precision, the shape (surface shape) of a substrate for forming the reflecting surface (mirror surface) needs to be accurately measured. FIG. 8 is a schematic view showing the arrangement of part of a composite mirror. Referring to FIG. 8, six segment mirrors $M_a$, $M_b$, $M_c$, $M_d$, $M_e$, and $M_f$ are arranged closely. The segment mirrors $M_a$ to $M_f$ are hexagonal mirrors each having a diagonal line length of 1.44 m. When forming a composite mirror by closely arranging a plurality of segment mirrors $M_a$ to $M_f$, an unnecessary region of each segment mirror near the periphery (region where no surface shape can be measured) needs to be reduced to increase the effective aperture of the composite mirror. This requires a technique of measuring the surface shape of a segment mirror in a non-contact manner at pitches of several mm (2 to 3 mm) for a region of the segment mirror except for a peripheral region inward from the periphery by a width of about 1 mm.

As the technique of measuring the surface shape of such a large surface in a non-contact manner, Japanese Patent Laid-Open No. 2009-145095 discloses a three-dimensional shape measurement apparatus including a non-contact type probe using a double-pass interference method. In this measurement apparatus, as shown in FIG. 9, light from a light source LS travels toward a cube corner reflector CC, standard surface SS, test surface TS, and the like, and is detected by a detector DD, thereby measuring the shape of the test surface TS. At this time, the surface shape of the test surface TS can be measured in a non-contact manner by measuring a change of the optical path length of measurement light while driving the non-contact type probe within the X-Y plane.

As the technique of measuring the surface shape of a test surface in a non-contact manner at a high spatial frequency with a resolution of 1 mm or less, U.S. Pat. No. 4,353,650 discloses a three-dimensional shape measurement apparatus including a non-contact type probe using a heterodyne interference method. In this measurement apparatus, light of a frequency f1 and light of a frequency f2 emitted by a light source are separated by a Wollaston prism into light of the frequency f1 and light of the frequency f2, which are condensed by a condenser lens at different positions on a test surface. The measurement apparatus is configured to hold a test surface to be rotatable about the rotation axis, and to condense (that is, focus) light of the frequency f1 at a point on the rotation axis. By rotating the test surface about the rotation axis, of the entire test surface, a region on the circumference of a circle centered at the point where the light of the frequency f1 is condensed is irradiated with light of the frequency f2. The surface shape in the region can therefore be measured.

However, when the conventional measurement apparatus is applied to measurement of the surface shape of a segment mirror, the following problems occur. For example, in the measurement apparatus disclosed in Japanese Patent Laid-Open No. 2009-145095, as shown in FIG. 9, measurement light reflected by the test surface TS reciprocates twice between the standard surface SS and the test surface TS. If the diameter of measurement light is decreased, an overlap with reference light necessary to obtain a heterodyne signal decreases, failing in obtaining a heterodyne signal of a satisfactory strength. To prevent this, measurement light has a diameter of at least about 3 mm. While measurement light reciprocates twice between the standard surface SS and the test surface TS, the first light and the second light reciprocate at a distance of about 6 mm. With such measurement light formed from two beams which are spaced apart from each other by 6 mm and have a diameter of 3 mm, it is difficult to measure the surface shape of a segment mirror at pitches of several mm. Further, with such measurement light, a surface shape in a region of the segment mirror near the periphery cannot be measured.

In the measurement apparatus disclosed in U.S. Pat. No. 4,353,650, light of the frequency f2 is condensed on a test surface, so the surface shape can be measured at a resolution of 1 mm or less. However, the measurement apparatus can measure only a surface shape in a region on the circumference of a circle centered at a point where light of the frequency f1 is condensed. For this reason, the measurement apparatus disclosed in U.S. Pat. No. 4,353,650 cannot measure a surface shape at pitches of several mm in an arbitrary region of a segment mirror except for the peripheral region. The test surface needs to fall within the range of the depth of focus of the condenser lens for condensing light of the frequency f2. It is therefore very difficult to measure the surface shape of a test surface having a curvature, such as a segment mirror.

SUMMARY OF THE INVENTION

The present invention provides, for example, a measurement apparatus advantageous for measuring a surface of an object.

According to one aspect of the present invention, there is provided a measurement apparatus which measures a measurement surface based on an interference signal obtained by causing measurement light reflected by the measurement surface and reference light reflected by a reference surface to interfere with each other, the apparatus including an interference optical system including a lens for focusing the measurement light to be incident on the measurement surface, and configured to cause the measurement light and the reference light to interfere with each other, and an adjusting device configured to adjust a focusing state of the measurement light focused by the lens such that a measurement point on the measurement surface positions within a range of a depth of focus of the lens, wherein the interference signal is obtained with the focusing state adjusted by the adjusting device.

Further aspects of the present invention will become apparent from the following description of exemplary embodiments with reference to the attached drawings.

BRIEF DESCRIPTION OF THE DRAWINGS

FIGS. 4A to 4D are views for explaining light reaching a test surface and light reflected by it.

FIGS. 10A to 10C are schematic views exemplifying the arrangement of the measurement unit of the measurement apparatus shown in FIG. 1.

DESCRIPTION OF THE EMBODIMENTS

Figure 1:
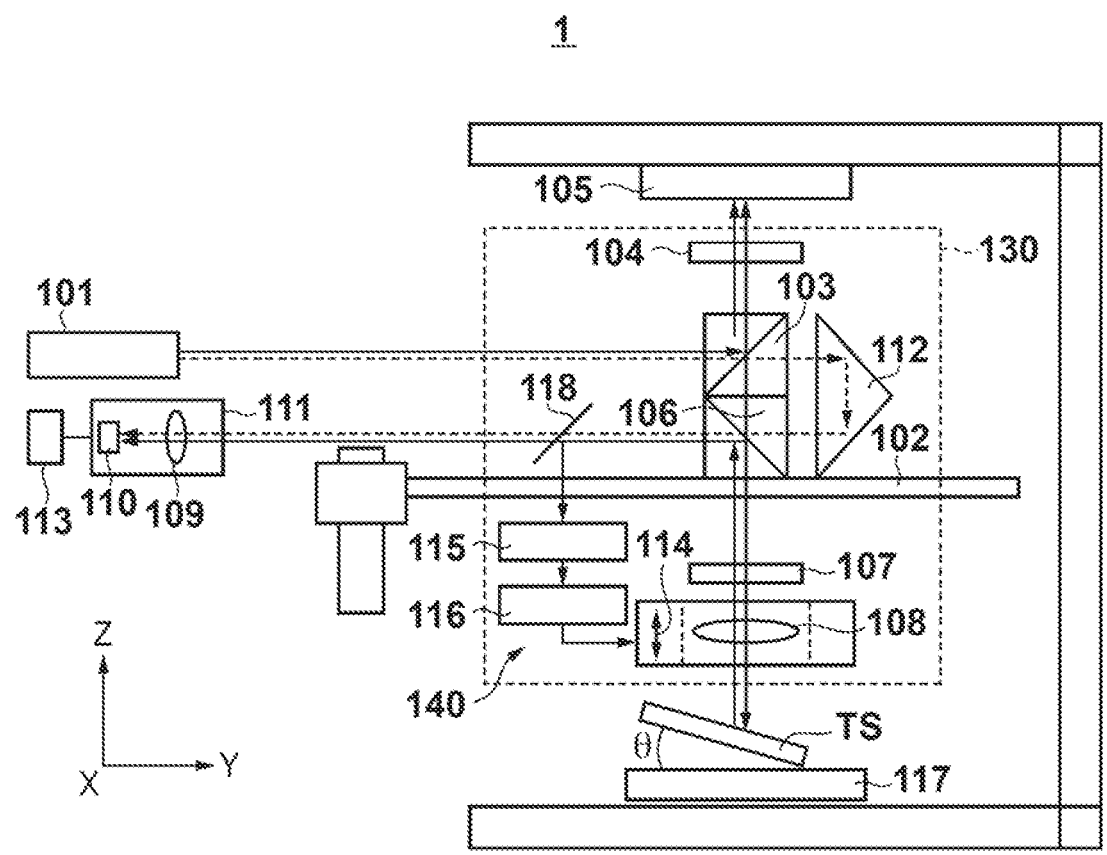
FIG. 1 is a schematic view showing the arrangement of a measurement apparatus in the first embodiment of the present invention.

Preferred embodiments of the present invention will be described below with reference to the accompanying drawings. Note that the same reference numerals denote the same members throughout the drawings, and a repetitive description thereof will not be given.

First Embodiment

Figure 2:
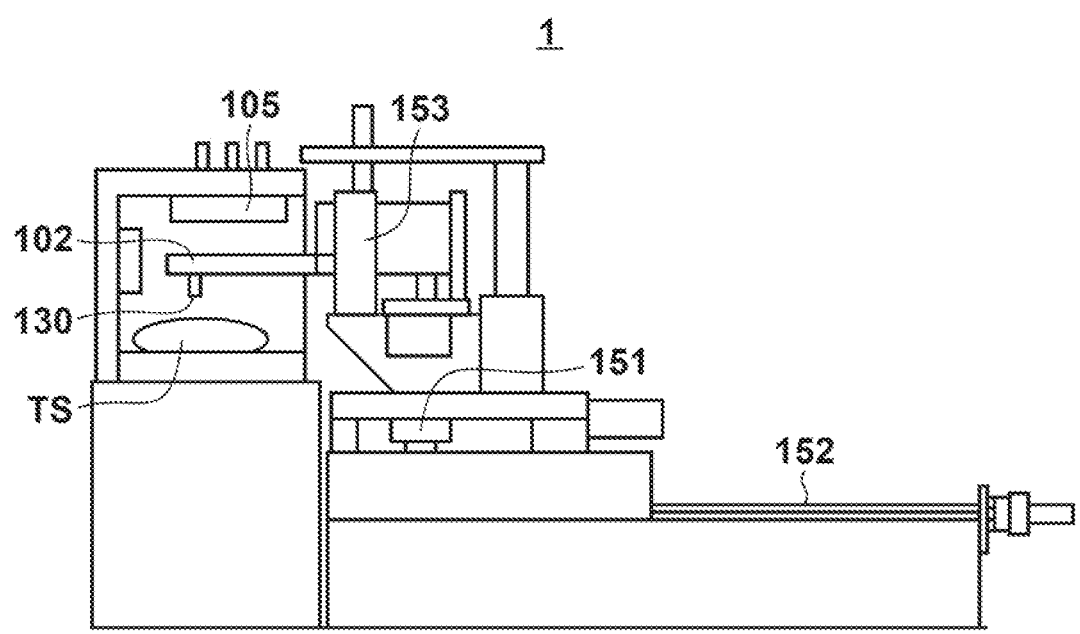
FIG. 2 is a schematic view showing the outer appearance of the measurement apparatus shown in FIG. 1.

FIG. 1 is a schematic view showing the arrangement of a measurement apparatus 1 in the first embodiment of the present invention. FIG. 2 is a schematic view showing the outer appearance of the measurement apparatus 1. The measurement apparatus 1 has a function of measuring a change of the optical path length of measurement light reflected by a test surface (measurement surface). In the first embodiment, the measurement apparatus 1 is embodied as a three-dimensional shape measurement apparatus including a non-contact type probe using the heterodyne interference method. The measurement apparatus 1 is suited to measurement of, for example, the shape of a test surface having a curvature and a circumscribed circle diameter of more than 1 m (for example, the surface shape of a segment mirror forming a composite mirror usable as the primary mirror of a telescope).

The measurement apparatus 1 includes, as main components, a light source 101, stage 102, standard mirror 105, detection unit 111, interference optical system 130, and autofocus system 140. The interference optical system 130 is an optical system in which light from the light source 101 configured to emit parallel light is split into two beams, one beam is caused to hit a test surface TS via a condenser lens 108, the other beam is caused to hit the reference surface, and the beam reflected by the test surface TS and the beam reflected by the reference surface are caused to interfere with each other. In the measurement apparatus 1, the interference optical system 130 functions as a non-contact type probe (optical probe).

Light emitted by the light source 101 enters a polarizing beam splitter 103 of the interference optical system 130 held by the stage 102. Although light emitted by the light source 101 is shown as if it were parallel to the Y- or Z-axis in FIG. 1, it contains a slight inclination error in practice.

As shown in FIG. 2, the stage 102 is driven within the X-Y plane by an X-axis driving unit 151 and Y-axis driving unit 152. The stage 102 is also driven within the Y-Z plane by the Y-axis driving unit 152 and a Z-axis driving unit 153. The X-axis driving unit 151, Y-axis driving unit 152, and Z-axis driving unit 153 function as a positioning mechanism of positioning (the stage 102 holding) the interference optical system 130.

An optical fiber, mirror, and the like may be interposed between the light source 101 and the polarizing beam splitter 103. The light source 101 emits two beams having different wavelengths and different directions of polarization, for example, in the embodiment, S-polarized light and P-polarized light having directions of polarization orthogonal to each other. The polarizing beam splitter 103 is configured to reflect S-polarized light and transmit P-polarized light. Of the beams from the light source 101, S-polarized light is reflected by the polarizing beam splitter 103, becomes light almost parallel to the Z-axis, and enters a λ/4 plate 104. Of the beams from the light source 101, P-polarized light passes through the polarizing beam splitter 103, becomes light almost parallel to the Y-axis, and enters a cube corner reflector 112 serving as a reference surface.

The light entering the λ/4 plate 104 passes through it, becomes circularly polarized light, and is reflected by the standard mirror (standard surface) 105. The light reflected by the standard mirror 105 passes again through the λ/4 plate 104, becomes P-polarized light, passes through the polarizing beam splitter 103, and enters a polarizing beam splitter 106. The light entering the polarizing beam splitter 106 passes through it, passes through a λ/4 plate 107, becomes circularly polarized light, and is condensed via the condenser lens 108 on the test surface TS held on a measurement stage 117 (is focused on the test surface TS). The light reflected by the test surface TS passes through the condenser lens 108, becomes parallel light, and enters the λ/4 plate 107. The light reflected by the test surface TS will be called measurement light. The measurement light entering the λ/4 plate 107 passes through it, becomes S-polarized light, is reflected by the polarizing beam splitter 106, and enters the detection unit 111 including a lens 109 and photodiode 110.

The light entering the cube corner reflector 112 is reflected in the incident direction by the cube corner reflector 112, and enters the polarizing beam splitter 106. The light reflected by the cube corner reflector 112 will be called reference light. The reference light entering the polarizing beam splitter 106 passes through it, and enters the detection unit 111 together with the measurement light reflected by the polarizing beam splitter 106. The detection unit 111 detects interfering light of the measurement light and reference light, and obtains an interference signal corresponding to the interfering light, for example, in the embodiment, a heterodyne interference signal. A processing unit 113 obtains a change of the optical path length of the measurement light based on the interference signal detected by the detection unit 111.

In the measurement apparatus 1, the detection unit 111 obtains a heterodyne interference signal while the X-axis driving unit 151 and Y-axis driving unit 152 drive the stage 102 within the X-Y plane. The shape of the test surface TS can be measured by obtaining a change of the optical path length of measurement light based on the heterodyne interference signal obtained by the detection unit 111. As is apparent from the optical path of measurement light described above, the heterodyne interference signal reflects the surface shape of the standard mirror (standard surface) 105. The surface shape of the standard mirror (standard surface) 105 is measured in advance by a surface shape measurement device (for example, interference measurement device) at a measurement precision of several nm or less. In this case, the component of the surface shape of the standard mirror 105 can be removed from the heterodyne interference signal obtained by the detection unit 111, so the shape of the test surface TS can be measured more accurately.

In the measurement apparatus 1, the autofocus system (adjusting device) 140 controls a position of the condenser lens 108 in a direction along the optical axis of the condenser lens 108. More specifically, the autofocus system 140 adjusts (controls) the distance between the condenser lens 108 and the test surface TS so that a measurement point on the test surface TS falls (is positioned) within the range of the depth of focus of the condenser lens 108.

The autofocus system 140 includes, for example, a lens driving unit 114, measurement unit 115, and focus control unit 116. The lens driving unit 114 is formed from a voice coil or the like, and moves the condenser lens 108 in a direction along the optical axis of the condenser lens 108. The measurement unit 115 measures a position (the focusing state of light condensed (focused) by the condenser lens 108) in a direction along the optical axis of the condenser lens 108. The focus control unit 116 controls the movement of the condenser lens 108 by the lens driving unit 114 based on the measurement result (focusing state) of the measurement unit 115 so that a measurement point on the test surface TS falls within the range of the depth of focus of the condenser lens 108.

An example of the arrangement of the measurement unit 115 will be explained. When light condensed by the condenser lens 108 falls outside the range of the depth of focus of the condenser lens 108, light which has been reflected by the test surface TS and has passed again though the condenser lens 108 does not become parallel light, but converges or diverges. In consideration of this, the measurement unit 115 is formed from a cylindrical lens and four-division sensor, which will be described later with reference to FIGS. 10A to 10C. Light reflected by the test surface TS is made to enter the measurement unit 115 via a half mirror 118, and the focusing state can be measured. However, the arrangement of the measurement unit 115 is not limited to an arrangement which uses the convergence or divergence of light that has been reflected by the test surface TS and has passed again through the condenser lens 108, and may be an arrangement which does not use light having passed through the condenser lens 108, within the scope of the present invention.

An example of the detailed arrangement of the measurement unit 115 will be explained with reference to FIGS. 10A to 10C. As a method of measuring a focusing state by using light which is reflected by the test surface TS, enters again the condenser lens 108, and returns to the optical system including the polarizing beam splitter 106, a method introduced in, for example, "Mechanoptics, 1981 Survey (Optical Technology Association" (literature 1) is applicable. Literature 1 introduces several methods such as an astigmatism method, knife-edge method, Foucault method, and critical angle method. Here, the astigmatism method will be exemplified.

FIGS. 10A to 10C are schematic views showing the arrangement of the measurement unit 115 using the astigmatism method. As shown in FIG. 10A, B is a position near the focus of the condenser lens 108, A is a position spaced apart from the condenser lens 108 by using position B as a criterion, and C is a position coming close to the condenser lens 108 by using position B as a criterion. Light LL reflected by the test surface TS serves as convergent light when reflected at position A, parallel light when reflected at position B, and divergent light when reflected at position C.

As shown in FIG. 10B, the measurement unit 115 includes a collimator lens 1002, cylindrical lens 1003, and four-division sensor 1006. Light LL1 passing through a surface of the cylindrical lens 1003 that has optically refractive power, and light LL2 passing through a surface of the cylindrical lens 1003 that has no optically refractive power are condensed, forming a circular or elliptical light intensity distribution on the four-division sensor 1006. In FIG. 10B, dotted lines indicate the focusing state of light LL2 passing through a surface (surface perpendicular to the paper surface) of the cylindrical lens 1003 that has no optically refractive power. The light intensity distribution formed on the four-division sensor 1006 will be explained in detail below. For example, as shown in FIG. 10C, convergent light reflected at position A forms a horizontally elongated light intensity distribution LD1 on the four-division sensor 1006. Parallel light reflected at position B forms a circular light intensity distribution LD2 on the four-division sensor 1006. Divergent light reflected at position C forms a vertically elongated light intensity distribution LD3 on the four-division sensor 1006. An arithmetic processing device OP can obtain the position of the test surface TS with respect to the condenser lens 108 based on optical outputs P1, P2, P3, and P4 respectively detected by four photosensors S1, S2, S3, and S4 forming the four-division sensor 1006. More specifically, it can be detected that the light LL has been reflected at position A if $P1+P3<P2+P4$, at position B if $P1+P3=P2+P4$, and at position C if $P1+P3>P2+P4$. By electrically detecting the $P1+P3$ value and the $P2+P4$ value at high precision, the position of the test surface TS can be obtained at high precision by using position B as a criterion (center).

In this manner, the measurement unit 115 can measure a focusing state by using light which is reflected by the test surface TS, enters again the condenser lens 108, and returns to the optical system including the polarizing beam splitter 106.

As described above, when light condensed by the condenser lens 108 falls outside the range of the depth of focus of the condenser lens 108, light which has been reflected by the test surface TS and has passed again though the condenser lens 108 converges or diverges. Further, even if the light falls within the range of the depth of focus of the condenser lens 108, there is a position on the test surface TS where the light LL slightly converges or diverges. Hence, the measurement unit 115 is formed from the collimator lens 1002, cylindrical lens 1003, and four-division sensor 1006. Light reflected by the test surface TS is made to enter the measurement unit 115 via the half mirror 118, and thus the focusing state can be measured. The half mirror 118 is an optical component which splits light at an appropriate ratio into light (transmitted light) passing through the half mirror 118 and light (reflected light) reflected by the half mirror 118, and is not limited to an optical component which splits light into transmitted light and reflected light at 50%.

Figure 3:
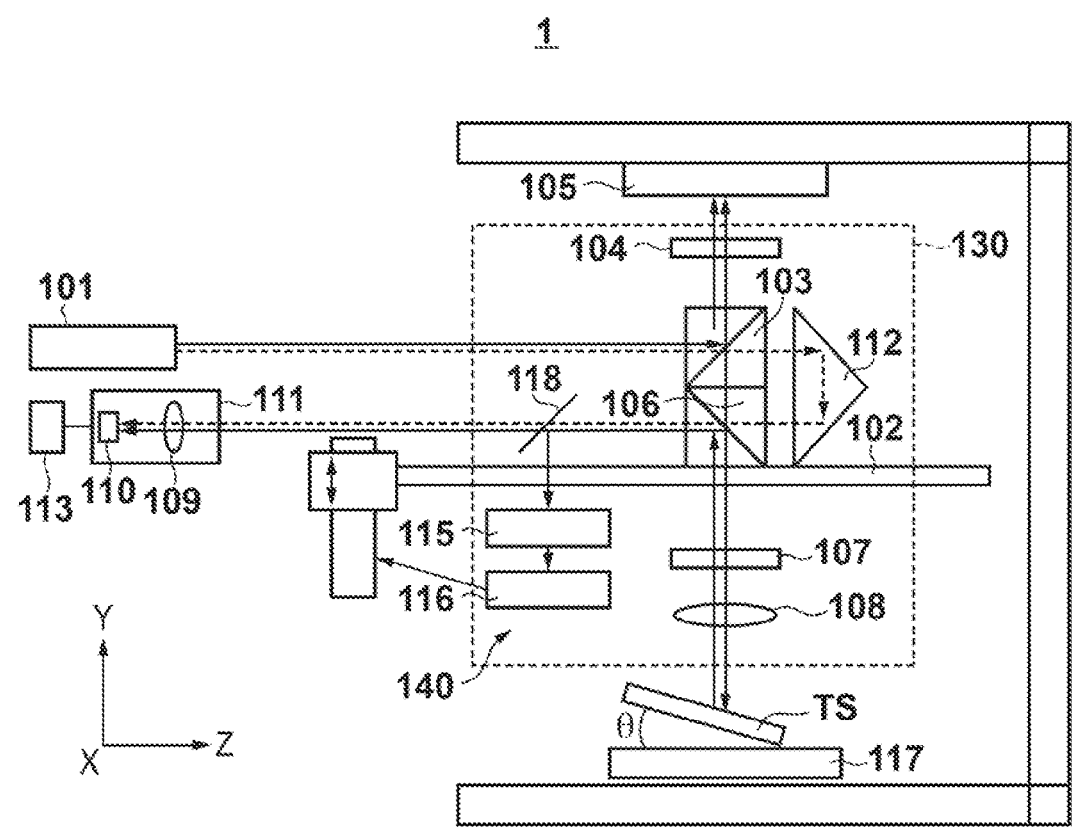
FIG. 3 is a schematic view showing the arrangement of the measurement apparatus in the first embodiment of the present invention.

As shown in FIG. 3, the autofocus system 140 may control a position of the condenser lens 108 in a direction along the optical axis of the condenser lens 108 by using not the lens driving unit 114, but the stage 102 holding the interference optical system 130, and the Z-axis driving unit 153. In this case, the focus control unit 116 controls the movement of the stage 102 by the Z-axis driving unit 153 based on the measurement result (focusing state) of the measurement unit 115 so that a measurement point on the test surface TS falls within the range of the depth of focus of the condenser lens 108. As described above, the Z-axis driving unit 153 is a driving unit which drives the stage 102 along the Z-axis, and can move, in a direction along the optical axis of the condenser lens 108, the condenser lens 108 of the interference optical system 130 held by the stage 102.

Light reaching the test surface TS held on the measurement stage 117, and light (measurement light) reflected by the test surface TS will be explained with reference to FIGS. 4A to 4D. FIG. 4A shows light L1 reaching the test surface TS via the condenser lens 108, and light L2 which is reflected by the test surface TS and enters the condenser lens 108, in a state in which the test surface TS is not inclined with respect to an optical axis AX of the condenser lens 108.

In a state in which the test surface TS is inclined by an angle θ with respect to the optical axis AX of the condenser lens 108, as shown in FIG. 4B, the light L1 entering the condenser lens 108 as parallel light is reflected at an angle 2θ by the test surface TS, and enters (enters again) the condenser lens 108. At this time, the autofocus system 140 controls the light L1 reaching the test surface TS so that a measurement point on the test surface TS falls within the range of the depth of focus of the condenser lens 108. Light L3 entering again the condenser lens 108 passes through it and becomes parallel light. Since the test surface TS is inclined by the angle θ with respect to the optical axis AX, the center of the optical axis of the light L3 shifts from that of the optical axis of the light L1 (light L2), as shown in FIG. 4C. A shift amount $D_s$ of the center of the optical axis of the light L3 from that of the optical axis of the light L1 is almost proportional to a distance $D_L$ between the condenser lens 108 and the test surface TS, and the angle 2θ.

The light (measurement light) L3 reflected by the test surface TS inclined by the angle θ with respect to the optical axis AX of the condenser lens 108, and light (reference light) reflected by the cube corner reflector 112 enter the detection unit 111 while overlapping each other, and are obtained as a heterodyne interference signal by the detection unit 111. At this time, the strength of the heterodyne interference signal decreases by the shift (shift amount $D_s$) of the center of the optical axis of the measurement light from that of the optical axis of the reference light because the test surface TS is inclined by the angle θ with respect to the optical axis AX of the condenser lens 108. However, such a decrease in strength does not affect the precision requested of phase measurement in the heterodyne interference method, and the surface shape can be obtained at high precision.

The embodiment has explained a state in which the test surface TS is inclined by the angle θ with respect to the optical axis AX of the condenser lens 108. However, even when the test surface TS has different angles at respective positions or the test surface TS has an aspherical shape, as shown in FIG. 4D, the surface shape can be similarly obtained at high precision.

The necessity to control to make a measurement point on the test surface TS fall within the range of the depth of focus of the condenser lens 108 will be explained with reference to FIGS. 5A to 5C. FIG. 5A shows a state in which the focus position of the condenser lens 108 coincides with a position $P_T$ of the test surface TS along the Z-axis (optical axis). In FIG. 5A, a range $R_{DF}$ of the depth of focus of the condenser lens 108 is defined by an upper limit value $R_{UP}$ and lower limit value $R_{LO}$ of the depth of focus of the condenser lens 108. $P_M$ is the position of the principle plane of the condenser lens 108 along the Z-axis (optical axis).

Figure 5C:
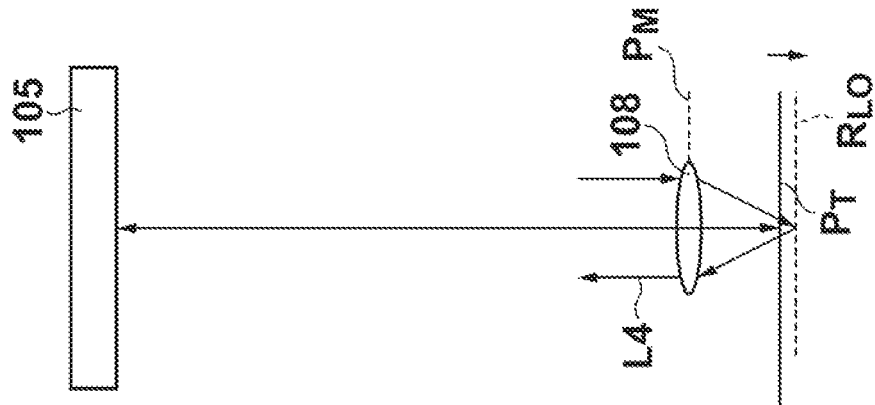
FIGS. 5A to 5C are views for explaining the necessity to control to make a measurement point on the test surface fall within the range of the depth of focus of a condenser lens.
Figure 5B:
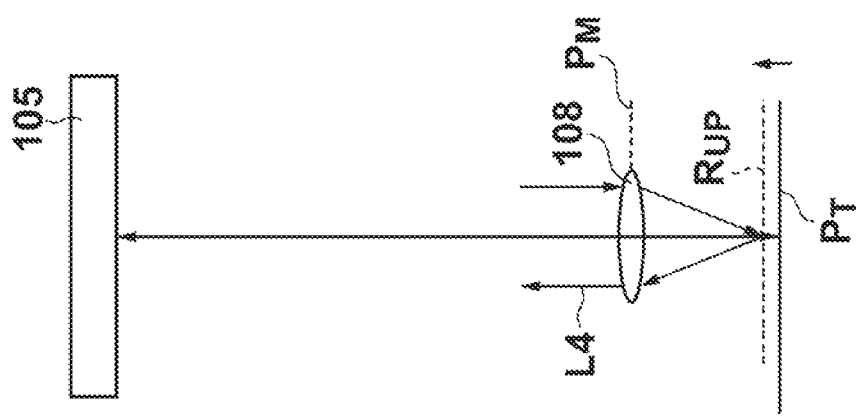
Figure 5A:
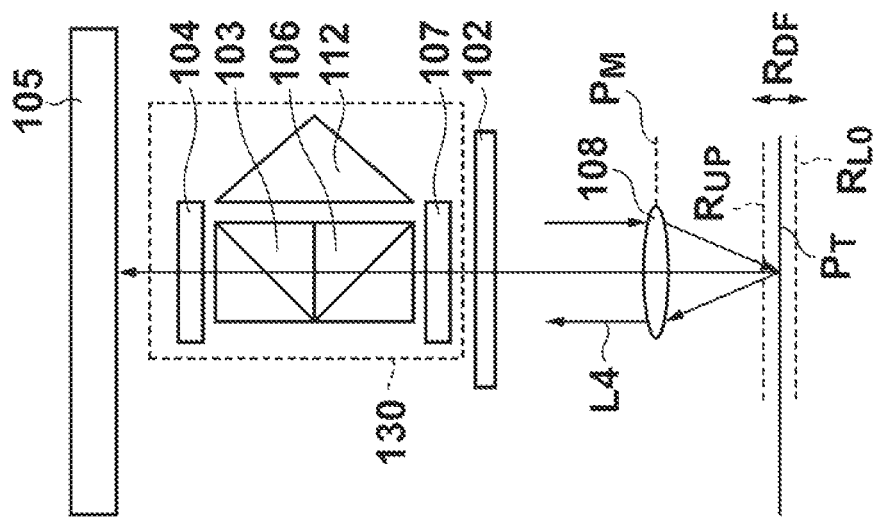

A case in which the focal point shifts along the optical axis with respect to the position $P_T$ of the test surface TS while the condenser lens 108 falls within the range $R_{DF}$ of the depth of focus (between the upper limit value $R_{UP}$ and lower limit value $R_{LO}$ of the depth of focus), as shown in FIGS. 5B and 5C, will be examined. In this case, the wavefront aberration of the wavefront of light L4 reflected by the test surface TS is sufficiently small. Thus, the heterodyne interference method can measure the moving amount of the test surface TS at a high precision of several nm or less.

In this fashion, the measurement apparatus 1 controls a position of the condenser lens 108 along the optical axis so that a measurement point on the test surface TS falls within the range of the depth of focus of the condenser lens 108. Accordingly, light (measurement light) which has been reflected by the test surface TS and has entered the condenser lens 108 is reflected as parallel light by the polarizing beam splitter 106, and detected by the detection unit 111 together with light (reference light) reflected by the cube corner reflector 112. The detection unit 111 therefore detects a satisfactory heterodyne signal. The measurement apparatus 1 can measure the shape of the test surface TS by obtaining a heterodyne interference signal by the detection unit 111 while moving the stage 102 holding the interference optical system 130 within the X-Y plane. In particular, the measurement apparatus 1 can measure the shape of a test surface having a curvature in a wide range at high precision at pitches of several mm, and thus is advantageous for measurement of the surface shape of a segment mirror.

Although a non-contact type probe using the heterodyne interference method is used as the interference optical system 130 in the embodiment, a non-contact type probe using the homodyne interference method may be used. In the surface measurement arrangement according to the embodiment, while the stage 102 is moved within the X-Y plane, the detection unit 111 obtains an interference signal to obtain a change of the optical path length of measurement light. Hence, an object characteristic correlated to the change can be measured regardless of the surface shape. For example, the surface roughness of an object can be measured.

The method of detecting a focusing state has been exemplified with reference to FIGS. 10A to 10C, but another method may be adopted to detect a focusing state. For example, the focusing state can be detected even in an arrangement in which an optical fiber (not shown) is interposed between the lens 109 and photodiode 110 forming the detection unit 111. When the test surface TS exists within the range of the depth of focus of the condenser lens 108, interfering light entering the lens 109 after reflected by the test surface TS becomes parallel light. For this reason, if the incident end face of the optical fiber (not shown) is arranged at the focus position of the lens 109, interfering light is satisfactorily condensed on the incident end face of the optical fiber (not shown) by the lens 109. As a result, the interfering light condensed on the incident end face is satisfactorily coupled by (efficiently guided into) the optical fiber (not shown). In contrast, when the test surface TS exists outside the range of the depth of focus of the condenser lens 108, the coupling efficiency of interfering light to the optical fiber (not shown) decreases. This is because light which has been reflected by the test surface TS and has passed again through the condenser lens 108 becomes not parallel light but convergent or divergent light, and after passing through the lens 109, is not satisfactorily condensed on the incident end face of the optical fiber (not shown). As a result, the coupling efficiency of interfering light to the optical fiber (not shown) decreases. By using this phenomenon, the focusing state can be detected by monitoring, based on an output from the photodiode 110, the quantity of light entering the photodiode 110 from the exit end face of the optical fiber (not shown).

Second Embodiment

Figure 6:
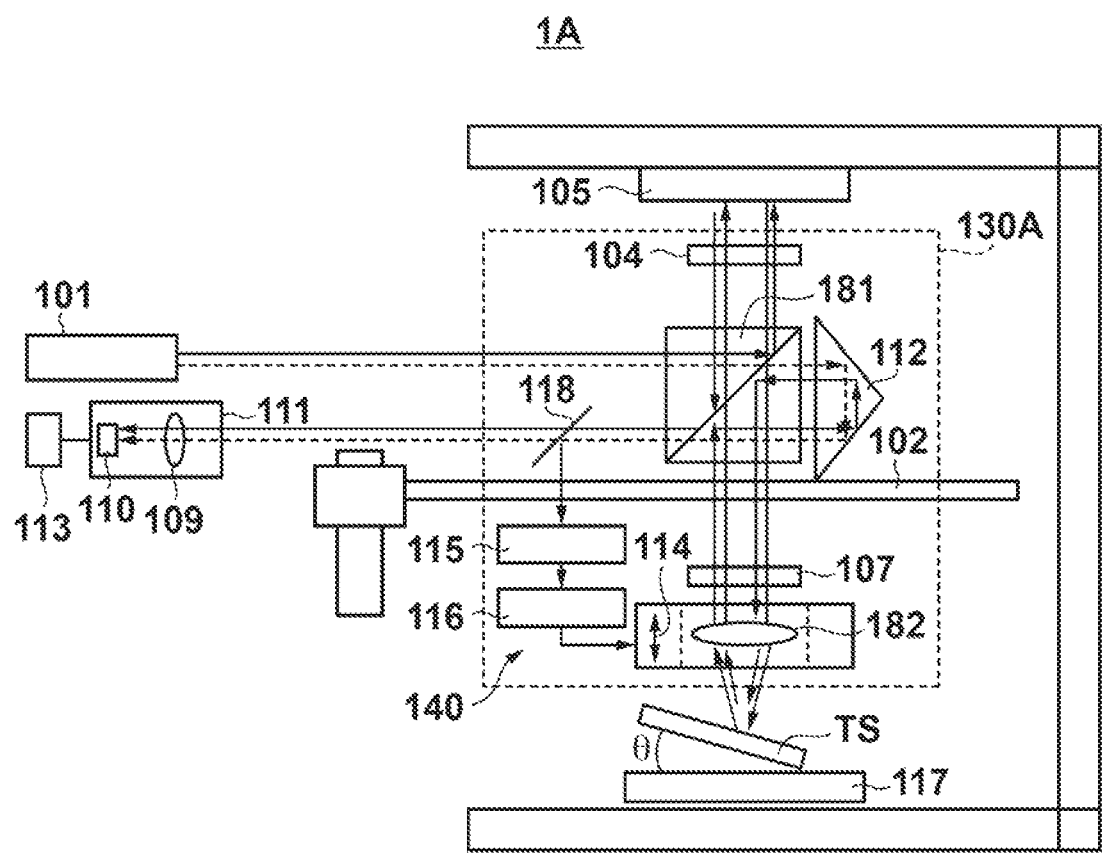
FIG. 6 is a schematic view showing the arrangement of a measurement apparatus in the second embodiment of the present invention.

FIG. 6 is a schematic view showing the arrangement of a measurement apparatus 1A in the second embodiment of the present invention. The measurement apparatus 1A has a function of causing measurement light reflected by the test surface and reference light reflected by the reference surface to interfere with each other, and measuring a change of the optical path length of the measurement light. In the second embodiment, the measurement apparatus 1A is embodied as a three-dimensional shape measurement apparatus including a non-contact type probe using the heterodyne interference method. The measurement apparatus 1A is suited to measurement of, for example, the shape of a test surface having a curvature and a circumscribed circle diameter of more than 1 m (for example, the surface shape of a segment mirror forming a composite mirror usable as the primary mirror of a telescope).

The measurement apparatus 1A includes, as main components, a light source 101, stage 102, standard mirror 105, detection unit 111, interference optical system 130A, and autofocus system 140. The interference optical system 130A forms a double-pass heterodyne interference system in which light from the light source 101 reciprocates twice between the test surface TS and the standard mirror 105. In the measurement apparatus 1A, the interference optical system 130A functions as a non-contact type probe (optical probe).

Light (parallel light) emitted by the light source 101 enters a polarizing beam splitter 181 of the interference optical system 130A held by the stage 102. The light source 101 emits two beams having different wavelengths and different directions of polarization, for example, in the embodiment, S-polarized light and P-polarized light having directions of polarization orthogonal to each other. The polarizing beam splitter 181 is configured to reflect S-polarized light and transmit P-polarized light. Of the beams from the light source 101, S-polarized light is reflected by the polarizing beam splitter 181, becomes light almost parallel to the Z-axis, and enters a λ/4 plate 104. Of the beams from the light source 101, P-polarized light passes through the polarizing beam splitter 181, becomes light almost parallel to the Y-axis, and enters a cube corner reflector 112 serving as a reference surface.

The light entering the λ/4 plate 104 passes through it, becomes circularly polarized light, and is reflected by the standard mirror (standard surface) 105. The light reflected by the standard mirror 105 passes again through the λ/4 plate 104, becomes P-polarized light, passes through the polarizing beam splitter 181, and enters a λ/4 plate 107. The light entering the λ/4 plate 107 passes through it, becomes circularly polarized light, and is condensed via a condenser lens 182 on the test surface TS held on a measurement stage 117 (is focused on the test surface TS). The light reflected by the test surface TS passes through the condenser lens 182, becomes parallel light, and enters the λ/4 plate 107. The light entering the λ/4 plate 107 passes through it, becomes S-polarized light, is reflected by the polarizing beam splitter 181, and enters the cube corner reflector 112. The light reflected by the cube corner reflector 112 is reflected by the polarizing beam splitter 181, and condensed again on the test surface TS via the λ/4 plate 107 and condenser lens 182. At this time, the light reflected by the test surface TS passes through the condenser lens 182, becomes parallel light, and enters the λ/4 plate 107. The light reflected twice by the test surface TS will be called measurement light. The measurement light entering the λ/4 plate 107 passes through the λ/4 plate 107, becomes P-polarized light, passes through the polarizing beam splitter 181, and enters the λ/4 plate 104. The light entering the λ/4 plate 104 passes through it, becomes circularly polarized light, and is reflected by the standard mirror (standard surface) 105. The light reflected by the standard mirror 105 passes again through the λ/4 plate 104, becomes S-polarized light, is reflected by the polarizing beam splitter 181, and enters the detection unit 111 formed from a lens 109 and photodiode 110.

The light entering the cube corner reflector 112 is reflected in the incident direction by the cube corner reflector 112, and enters the polarizing beam splitter 181. The light reflected by the cube corner reflector 112 without being reflected by the test surface TS will be called reference light. The reference light entering the polarizing beam splitter 181 passes through it, and enters the detection unit 111 together with the measurement light reflected by the polarizing beam splitter 181. The detection unit 111 detects interfering light of the measurement light and reference light, and obtains an interference signal corresponding to the interfering light, for example, in the embodiment, a heterodyne interference signal. A processing unit 113 obtains a change of the optical path length of the measurement light based on the interference signal detected by the detection unit 111.

In the measurement apparatus 1A, the detection unit 111 obtains a heterodyne interference signal while an X-axis driving unit 151 and Y-axis driving unit 152 drive the stage 102 within the X-Y plane. In other words, the detection unit 111 obtains a heterodyne interference signal while (the stage 102 holding) the interference optical system 130A is positioned so that light from the interference optical system 130A (light condensed by the condenser lens 182) enters a plurality of positions on the test surface TS. The shape of the test surface TS can be measured by obtaining a change of the optical path length of measurement light based on the heterodyne interference signal obtained by the detection unit 111.

In the measurement apparatus 1A, similar to the measurement apparatus 1, a position of the condenser lens 182 in a direction along the optical axis of the condenser lens 182 is controlled so that a measurement point on the test surface TS falls (is positioned) within the range of the depth of focus of the condenser lens 182. Accordingly, light (measurement light) which has been reflected by the test surface TS and has entered the condenser lens 182 is reflected as parallel light by the polarizing beam splitter 181, and detected by the detection unit 111 together with light (reference light) reflected by the cube corner reflector 112. The detection unit 111 therefore detects a satisfactory heterodyne signal. Even when the interference optical system 130A is formed from a double-pass heterodyne interference system, the measurement apparatus 1A can measure the shape of the test surface TS at high precision. More specifically, the measurement apparatus 1A can measure the shape of the test surface TS at high precision by obtaining a heterodyne interference signal by the detection unit 111 while moving the stage 102 holding the interference optical system 130A within the X-Y plane.

Third Embodiment

Figure 7:
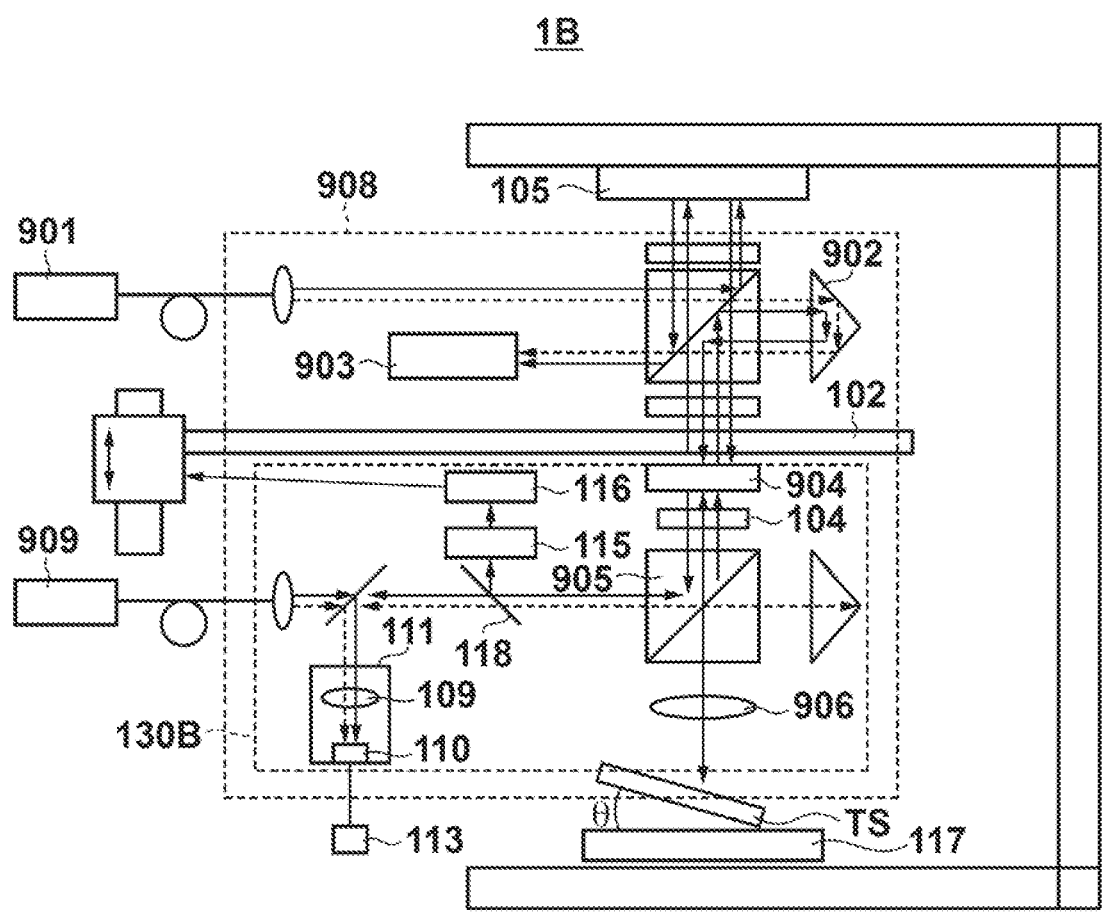
FIG. 7 is a schematic view showing the arrangement of a measurement apparatus in the third embodiment of the present invention.
Figure 8:
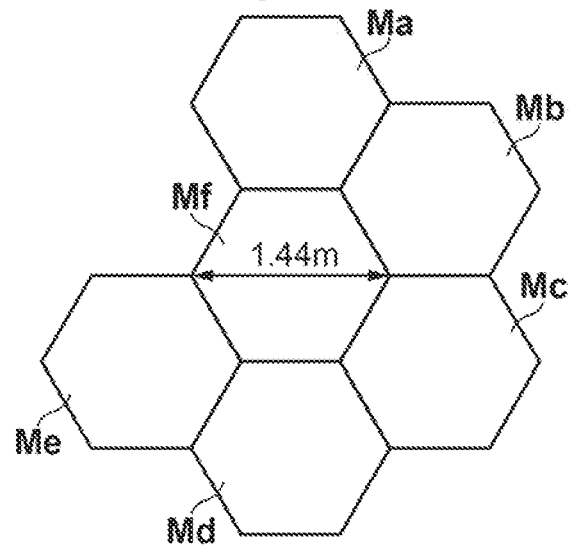
FIG. 8 is a schematic view showing the arrangement of part of a composite mirror.
Figure 9:
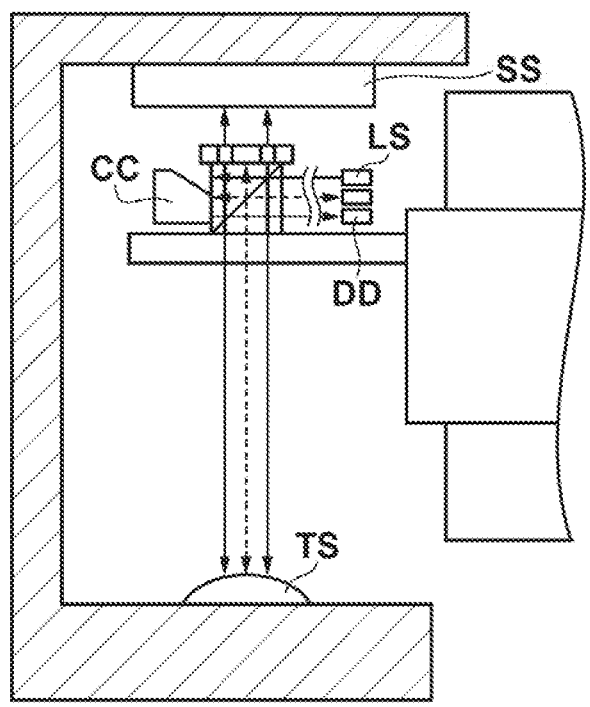
FIG. 9 is a schematic view showing the arrangement of a three-dimensional shape measurement apparatus.

FIG. 7 is a schematic view showing the arrangement of a measurement apparatus 1B in the third embodiment of the present invention. The measurement apparatus 1B has a function of measuring a change of the optical path length of measurement light reflected by the test surface. In the third embodiment, the measurement apparatus 1B is embodied as a three-dimensional shape measurement apparatus including a non-contact type probe using the heterodyne interference method.

The measurement apparatus 1B includes, as main components, a second light source 909, stage 102, standard mirror 105, interference optical system (measurement interference optical system) 130B, and autofocus system 140. The interference optical system 130B forms a single-pass heterodyne interference system in which light from the second light source 909 reciprocates once between the test surface TS and a polarizing beam splitter 905. In the measurement apparatus 1B, the interference optical system 130B functions as a non-contact type probe (optical probe). An outline of the arrangement of the measurement apparatus 1B will be explained.

Light (parallel light) emitted by a first light source 901 is used to obtain a change of the optical path length of the first measurement light reflected by the standard mirror 105 and a double-sided mirror 904. Light emitted by the first light source 901 passes through a polarizing beam splitter, $\lambda/4$ plates arranged above and below the polarizing beam splitter, a cube corner reflector 902, and the like, and is detected by a detection unit 903. The detection unit 903 is formed from a lens, photodiode, processing unit, and the like, and obtains a change of the optical path length of measurement light based on a detected interference signal. By obtaining a change of the optical path length of the first measurement light, vertical movement of an interference optical system 908 including the interference optical system 130B serving as a single-pass optical system with respect to the standard mirror 105 can be measured at high precision.

Light (parallel light) emitted by the second light source 909 is used to obtain a change of the optical path length of the second measurement light reflected by the double-sided mirror 904 and test surface TS. Light emitted by the second light source 909 is separated into light which passes through the polarizing beam splitter 905 and then passes through a cube corner reflector, and light which is reflected by the polarizing beam splitter 905 and then passes through a $\lambda/4$ plate, the double-sided mirror 904, a condenser lens 906, and the like. A change of the optical path length of measurement light is obtained based on an interference signal detected by a detection unit 111. By obtaining a change of the optical path length of the second measurement light, the surface shape of the test surface TS can be measured at high precision by using the interference optical system 908 as a criterion.

The measurement apparatus 1B obtains a change of the optical path length of the first measurement light and a change of the optical path length of the second measurement light by using the interference optical system 908 including the interference optical system 130B serving as a single-pass optical system. Accordingly, the influence of vertical movement of the interference optical system 908 including the interference optical system 130B serving as a single-pass optical system can be reduced, and the shape of the test surface TS can be measured at a high precision of several nm or less by using the standard mirror 105 as a criterion, similar to the measurement apparatuses 1 and 1A. The arrangement of the interference optical system 130B in the measurement apparatus 1B will be explained in detail.

Light (parallel light) emitted by the second light source 909 enters the polarizing beam splitter 905 of the interference optical system 130B held by the stage 102. The second light source 909 emits two beams having different wavelengths and different directions of polarization, for example, in the embodiment, S-polarized light and P-polarized light having directions of polarization orthogonal to each other. The polarizing beam splitter 905 is configured to reflect S-polarized light and transmit P-polarized light. Of the beams from the second light source 909, S-polarized light is reflected by the polarizing beam splitter 905, becomes light almost parallel to the Z-axis, and enters a $\lambda/4$ plate 104. Of the beams from the second light source 909, P-polarized light passes through the polarizing beam splitter 905, becomes light almost parallel to the Y-axis, and enters a cube corner reflector serving as a reference surface.

The light entering the $\lambda/4$ plate 104 passes through it, becomes circularly polarized light, and is reflected by the double-sided mirror 904. The light reflected by the double-sided mirror 904 passes again through the $\lambda/4$ plate 104, becomes P-polarized light, passes through the polarizing beam splitter 905, and is condensed on the test surface TS held on a measurement stage 117 via the condenser lens 906 (is focused on the test surface TS). The light reflected by the test surface TS passes through the condenser lens 906, becomes parallel light, passes through the polarizing beam splitter 905, and enters the $\lambda/4$ plate 104. The light entering the $\lambda/4$ plate 104 passes through it, becomes circularly polarized light, and is reflected by the double-sided mirror 904. The light reflected by the double-sided mirror 904 passes again through the $\lambda/4$ plate 104, becomes S-polarized light, is reflected by the polarizing beam splitter 905 and a half mirror 119, and then enters the detection unit 111 formed from a lens 109 and photodiode 110. The half mirror 119 is an optical element which splits light at an appropriate ratio into light (transmitted light) passing through the half mirror 119 and light (reflected light) reflected by the half mirror 119, and is not limited to an optical element which splits light into transmitted light and reflected light at 50%. The detection unit 111 detects interfering light of measurement light and reference light, and obtains an interference signal corresponding to the interfering light, for example, in the embodiment, a heterodyne interference signal. A processing unit 113 obtains a change of the optical path length of the measurement light based on the interference signal detected by the detection unit 111.

In the measurement apparatus 1B, the detection unit 111 obtains a heterodyne interference signal while an X-axis driving unit 151 and Y-axis driving unit 152 move the stage 102 within the X-Y plane. In other words, the detection unit 111 obtains a heterodyne interference signal while (the stage 102 holding) the interference optical system 130B is positioned so that light from the interference optical system 130B (light condensed by the condenser lens 906) sequentially enters a plurality of positions on the test surface TS. The shape of the test surface TS can be measured by obtaining a change of the optical path length of measurement light based on the heterodyne interference signal obtained by the detection unit 111.

Fourth Embodiment

Figure 11:
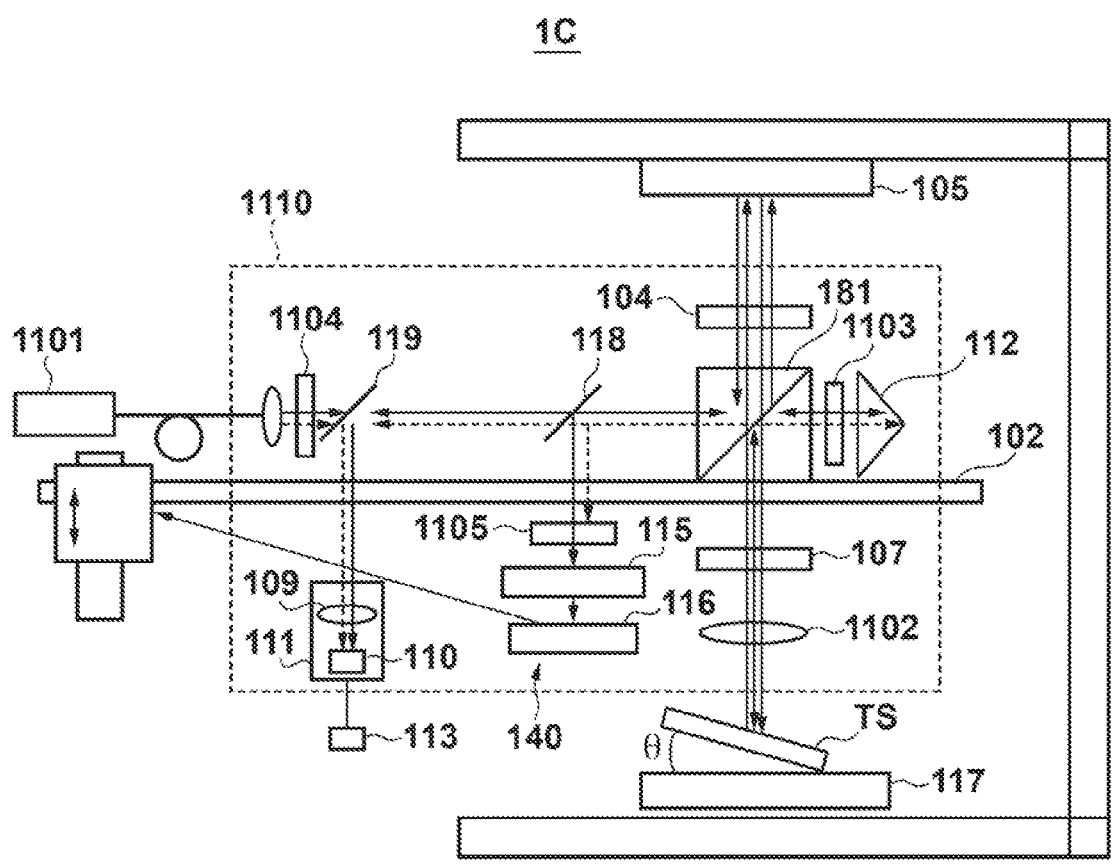
FIG. 11 is a schematic view showing the arrangement of a measurement apparatus in the fourth embodiment of the present invention.

FIG. 11 is a schematic view showing the arrangement of a measurement apparatus 1C in the fourth embodiment of the present invention. The measurement apparatus 1C has a function of causing measurement light reflected by the test surface and reference light reflected by the reference surface to interfere with each other, and measuring a change of the optical path length of the measurement light. In the fourth embodiment, the measurement apparatus 1C is embodied as a three-dimensional shape measurement apparatus including a non-contact type probe using the heterodyne interference method.

The measurement apparatus 1C includes, as main components, a light source 1101, stage 102, standard mirror 105, detection unit 111, interference optical system 1110, and autofocus system 140. In the fourth embodiment, the interference optical system 1110 forms a double-pass heterodyne interference system in which light from the light source 1101 reciprocates twice between the test surface TS and the standard mirror 105. In the measurement apparatus 1C, the interference optical system 1110 functions as a non-contact type probe (optical probe). In the fourth embodiment, measurement light reciprocates through the center of a condenser lens, so the design and manufacture of the condenser lens can be further simplified, compared to an arrangement in which measurement light reciprocates through the periphery of the condenser lens.

Light (parallel light) emitted by the light source 1101 enters a polarizing beam splitter 181 of the interference optical system 1110 held by the stage 102. The light source 1101 emits two beams having different wavelengths and different directions of polarization, for example, in the embodiment, S-polarized light and P-polarized light having directions of polarization orthogonal to each other. Of the beams from the light source 1101, S-polarized light is reflected by the polarizing beam splitter 181, becomes light almost parallel to the Z-axis, and enters a λ/4 plate 104. Of the beams from the light source 1101, P-polarized light passes through the polarizing beam splitter 181, becomes light almost parallel to the Y-axis, and enters a cube corner reflector 112 serving as a reference surface.

The light entering the λ/4 plate 104 passes through it, becomes circularly polarized light, and is reflected by the standard mirror (standard surface) 105. The light reflected by the standard mirror 105 passes again through the λ/4 plate 104, becomes P-polarized light, passes through the polarizing beam splitter 181, and enters a λ/4 plate 107. The light entering the λ/4 plate 107 passes through it, becomes circularly polarized light, and is condensed via a condenser lens 1102 on the test surface TS held on a measurement stage 117 (is focused on the test surface TS). The light reflected by the test surface TS passes through the condenser lens 1102, becomes parallel light, and enters the λ/4 plate 107. The light entering the λ/4 plate 107 passes through it, becomes S-polarized light, is reflected by the polarizing beam splitter 181, and enters the cube corner reflector 112. The light reflected by the cube corner reflector 112 is reflected by the polarizing beam splitter 181, and condensed again on the test surface TS via the λ/4 plate 107 and condenser lens 1102. At this time, the light reflected by the test surface TS passes through the condenser lens 1102, becomes parallel light, and enters the λ/4 plate 107. The light reflected twice by the test surface TS will be called measurement light. The measurement light entering the λ/4 plate 107 passes through the λ/4 plate 107, becomes P-polarized light, passes through the polarizing beam splitter 181, and enters the λ/4 plate 104. The light entering the λ/4 plate 104 passes through it, becomes circularly polarized light, and is reflected by the standard mirror (standard surface) 105. The light reflected by the standard mirror 105 passes again through the λ/4 plate 104, becomes S-polarized light, is reflected by the polarizing beam splitter 181 and a half mirror 119, and enters the detection unit 111 formed from a lens 109 and photodiode 110.

The light entering the cube corner reflector 112 is reflected in the incident direction by the cube corner reflector 112, and enters the polarizing beam splitter 181. The light reflected by the cube corner reflector 112 without being reflected by the test surface TS will be called reference light. The reference light entering the polarizing beam splitter 181 passes through it, and enters the detection unit 111 together with the measurement light reflected by the polarizing beam splitter 181. The detection unit 111 detects interfering light of the measurement light and reference light, and obtains an interference signal corresponding to the interfering light, for example, in the embodiment, a heterodyne interference signal. A processing unit 113 obtains a change of the optical path length of the measurement light based on the interference signal detected by the detection unit 111.

In the measurement apparatus 1C, the light source 1101 is preferably a light source having a function of stabilizing a laser output using a Faraday rotator or the like even when there is so-called return light returning from the interference optical system 1110 to the light source 1101. This is because, in the measurement apparatus 1C, unlike the measurement apparatus 1A, light reflected by the test surface TS or light reflected by the cube corner reflector 112 tends to return along the optical path of light emitted by the light source 1101 and enter the light source 1101. As shown in FIG. 11, light attenuation optical filters 1103 and 1104 are arranged in the interference optical system 1110. Each of the light attenuation optical filters 1103 and 1104 is formed from, for example, an ND filter and polarizing plate, and has a function of decreasing the intensity of light. By using the light attenuation optical filters 1103 and 1104, the measurement apparatus 1C can attenuate the intensity of light returning to the light source 1101, and prevent a decrease in measurement precision caused by the return light.

A polarizing plate 1105 may be interposed between a half mirror 118 and a measurement unit 115 for measuring a focusing state. By using the polarization characteristic, the polarizing plate 1105 can transmit, of light reflected by the half mirror 118, only light reflected by the test surface TS that is necessary for measurement of a focusing state, and remove reference light and the like unnecessary for measurement of a focusing state. With this arrangement, the measurement unit 115 can detect light at a high S/N ratio and measure a focusing state at high precision.

In the measurement apparatus 1C, the detection unit 111 obtains a heterodyne interference signal while an X-axis driving unit 151 and Y-axis driving unit 152 move the stage 102 within the X-Y plane. In other words, the detection unit 111 obtains a heterodyne interference signal while (the stage 102 holding) the interference optical system 1110 is positioned so that light from the interference optical system 1110 (light condensed by the condenser lens 1102) enters a plurality of positions on the test surface TS. The shape of the test surface TS can be measured by obtaining a change of the optical path length of measurement light based on the heterodyne interference signal obtained by the detection unit 111.

In the measurement apparatus 1C, similar to the measurement apparatus 1A, a position of the condenser lens 1102 in a direction along the optical axis of the condenser lens 1102 is controlled so that a measurement point on the test surface TS falls (is positioned) within the range of the depth of focus of the condenser lens 1102. Accordingly, light (measurement light) which has been reflected by the test surface TS and has entered the condenser lens 1102 returns as parallel light to the polarizing beam splitter 181. The light is then detected by the detection unit 111 together with light (reference light) reflected by the cube corner reflector 112. Since the wavefront aberration of the measurement light is small, the detection unit 111 obtains satisfactory interfering light and detects a satisfactory heterodyne signal. Further, in the measurement apparatus 1C, measurement light reciprocates through the center of the condenser lens, so the design and manufacture of a high-performance condenser lens in which the wavefront aberration is small can be further simplified, compared to a case in which measurement light reciprocates through the periphery of the condenser lens. Generally in a double-pass heterodyne interference system, measurement light reciprocates twice through the condenser lens, and the wavefront aberration may be doubled, compared to a single-pass interference system in which measurement light reciprocates only once through the condenser lens. For this reason, the interference signal may be deteriorated. However, in the measurement apparatus 1C, measurement light reciprocates through the center of the condenser lens, and the apparatus can be formed using a high-performance condenser lens in which the wavefront aberration is small. Even when the interference optical system 1110 is formed from a double-pass heterodyne interference system, the measurement apparatus 1C can measure the shape of the test surface TS at high precision. More specifically, the measurement apparatus 1C can measure the shape of the test surface TS by obtaining a heterodyne interference signal by the detection unit 111 while moving the stage 102 holding the interference optical system 1110 within the X-Y plane. Further, since measurement light passes through only the center of the condenser lens 1102, the design and manufacture of the condenser lens 1102 are simplified, embodying a high-precision, low-cost three-dimensional shape measurement apparatus.

In the above-described embodiments, the focusing state of light condensed by the condenser lens is detected, and the focusing state (for example, the distance between the condenser lens and the test surface) is adjusted based on the detected focusing state. However, the present invention is not limited to this, and a storage unit which stores shape information representing the target shape of a test surface may be prepared and the focusing state may be adjusted based on the shape information stored in the storage unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053686 filed on Mar. 9, 2012 and Japanese Patent Application No. 2012-165139 filed on Jul. 25, 2012, which are hereby incorporated by reference herein in their entirety.

What is claimed is:

1. A measurement apparatus for measuring a measurement surface based on an interference signal obtained from measurement light reflected by the measurement surface and reference light reflected by a reference surface interfering with each other, the measurement apparatus comprising:
a first interference optical system including a lens configured to focus the measurement light to be incident on the measurement surface, and cause the measurement light and the reference light to interfere with each other;
an adjusting device configured to adjust a focusing state of the measurement light focused by the lens so that a measurement point on the measurement surface positions within a range of a depth of focus of the lens; and
a second interference optical system configured to measure a position of the first interference optical system in a direction along an optical axis of the lens, with the focusing state adjusted by the adjusting device,
wherein the measurement surface is measured based on the measured position and the interference signal, and
wherein the interference signal is obtained with the focusing state adjusted by the adjusting device.

2. The apparatus according to claim 1, wherein the second interference optical system is configured to measure the position of the first interference optical system based on a second interference signal, which is obtained from second measurement light reflected by a second measurement surface of the first interference optical system and reference light reflected by a second reference surface interfering with each other.

3. A measurement apparatus for measuring a measurement surface based on an interference signal obtained from measurement light reflected by the measurement surface and reference light reflected by a reference surface interfering with each other, the measurement apparatus comprising:
a first interference optical system including a lens configured to focus the measurement light to be incident on the measurement surface, and cause the measurement light reflected by a standard surface and the measurement surface and the reference light to interfere with each other;
an adjusting device configured to adjust a focusing state of the measurement light focused by the lens so that a measurement point on the measurement surface positions within a range of a depth of focus of the lens;
a positioning mechanism configured to position the first interference optical system so that the measurement light focused by the lens sequentially enters a plurality of measurement points on the measurement surface,
wherein the interference signal is obtained with the focusing state adjusted by the adjusting device; and
a second interference optical system configured to measure a position of the first interference optical system in a direction along an optical axis of the lens, with the focusing state adjusted by the adjusting device,
wherein the measurement surface is measured based on the measured position and the interference signal.

4. The apparatus according to claim 3, further comprising:
a measurement device configured to measure the focusing state,
wherein the adjusting device is configured to adjust the focusing state based on the measured focusing state.

5. The apparatus according to claim 3, further comprising:
a storage configured to store shape information representing a target shape of the measurement surface,
wherein the adjusting device is configured to adjust the focusing state based on the stored shape information.

6. The apparatus according to claim 3, wherein the adjusting device includes a driving device configured to move the lens in the direction along the optical axis of the lens.

7. The apparatus according to claim 3, further comprising:
a stage configured to hold the interference optical system,
wherein the adjusting device includes a driving device configured to move the stage in the direction along the optical axis of the lens.

8. The apparatus according to claim 3, wherein the first interference optical system is configured so that the measurement light is reflected twice at the standard surface and the measurement surface, respectively.

9. The apparatus according to claim 3, wherein the first interference optical system is configured so that the measurement light to and from the measurement surface passes through a central portion of the lens.

10. The apparatus according to claim 3, further comprising a light source configured to emit two lights for obtaining, as the interference signal, a heterodyne interference signal, wavelengths of which are different from each other.

11. The apparatus according to claim 3, further comprising a processor configured to obtain a shape of the measurement surface based on the measured position and the interference signal obtained with respect to each of the plurality of measurement points.

12. The apparatus according to claim 3, wherein the apparatus is configured to measure the measurement surface having a curvature.

13. The apparatus according to claim 3, wherein the second interference optical system is configured to measure the position of the first interference optical system based on a second interference signal, which is obtained from second measurement light reflected by a second measurement surface of the first interference optical system and reference light reflected by a second reference surface interfering with each other.

14. The apparatus according to claim 3, wherein the standard surface is on a double-sided mirror, and the second interference optical system is configured to measure the position of the first interference optical system via a surface, on the double-sided mirror, opposite from the standard surface.

15. A measurement apparatus for measuring a measurement surface based on an interference signal obtained from measurement light reflected by the measurement surface and reference light reflected by a reference surface interfering with each other, the measurement apparatus comprising:
- an interference optical system including a lens configured to focus the measurement light to be incident on the measurement surface, and cause the measurement light and the reference light to interfere with each other;
- an adjusting device configured to adjust a focusing state of the measurement light focused by the lens so that a measurement point on the measurement surface positions within a range of a depth of focus of the lens, wherein the interference signal is obtained with the focusing state adjusted by the adjusting device; and
- a measuring device configured to measure a position of the interference optical system in a direction along an optical axis of the lens, with the focusing state adjusted by the adjusting device, wherein the measurement surface is measured based on the measured position and the interference signal.

16. A measurement apparatus for measuring a measurement surface based on an interference signal obtained from measurement light reflected by the measurement surface and reference light reflected by a reference surface interfering with each other, the measurement apparatus comprising:
- an interference optical system including a lens configured to focus the measurement light to be incident on the measurement surface, and cause the measurement light reflected by a standard surface and the measurement surface and the reference light to interfere with each other;
- an adjusting device configured to adjust a focusing state of the measurement light focused by the lens so that a measurement point on the measurement surface positions within a range of a depth of focus of the lens;
- a positioning mechanism configured to position the interference optical system so that the measurement light focused by the lens sequentially enters a plurality of measurement points on the measurement surface, wherein the interference signal is obtained with the focusing state adjusted by the adjusting device; and

- a measuring device configured to measure a position of the interference optical system in a direction along an optical axis of the lens, with the focusing state adjusted by the adjusting device, wherein the measurement surface is measured based on the measured position and the interference signal.

* * * * *